May 6, 1952 — F. M. SIEDENBURG — 2,595,898
FILM DEVELOPING REEL
Filed Feb. 7, 1948
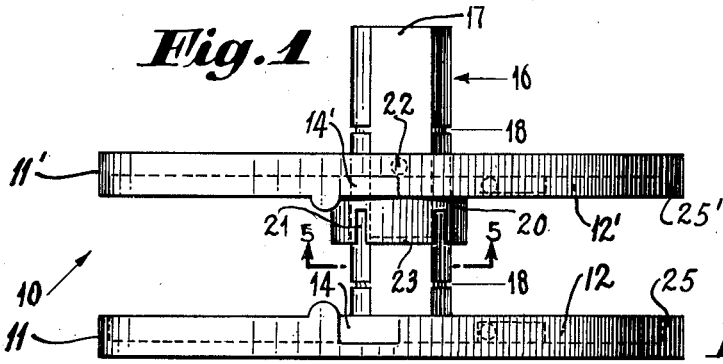
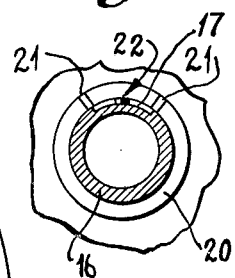
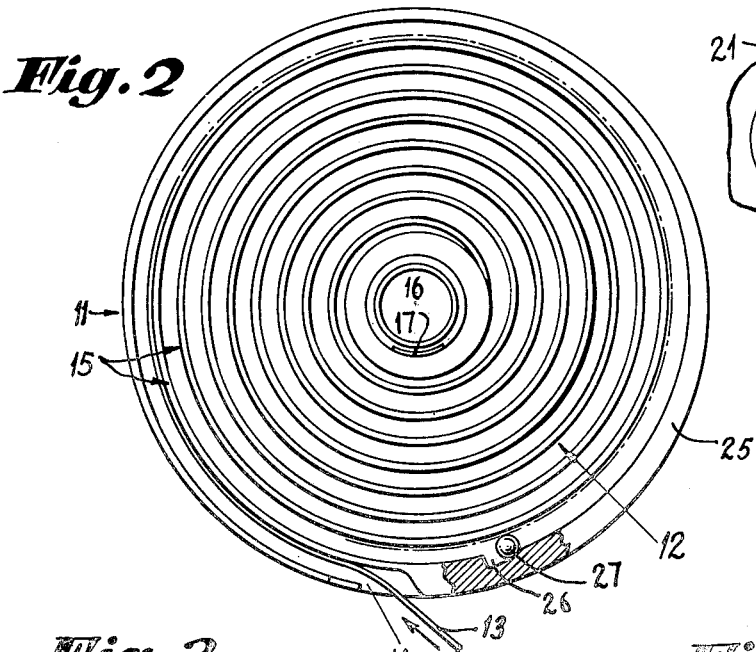
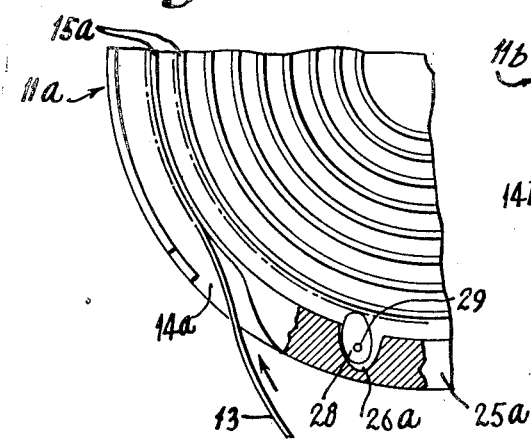
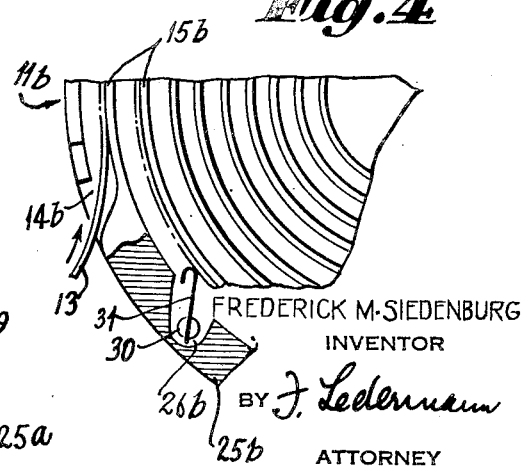
FREDERICK M. SIEDENBURG
INVENTOR
BY J. Ledermann
ATTORNEY Patented May 6, 1952

2,595,898

UNITED STATES PATENT OFFICE 2,595,898

FILM DEVELOPING REEL

Frederick M. Siedenburg, Richmond Hill, N. Y., assignor to General Aniline & Film Corporation, New York, N. Y., a corporation of Delaware Application February 7, 1948, Serial No. 6,938

7 Claims. (Cl. 242—77)

This invention relates to film retaining devices for film development spools whereby a photographic film may be threaded or wound into the spool between two end disks, but which will prevent outward passage of the film from the spool.

An object of this invention is to provide automatically actuating engaging means forming an integral element of the spool whereby when the wound film and spool are placed in a developing solution in a tank, the film will be retained in spaced apart coiled relation to insure free access of the developer to all portions of the sensitive surface to secure uniformly developed negatives.

Another object of this invention is to provide a frictional film edge engaging mechanism which also permits normal expansion and contraction of the film during the developing and drying processes without placing any undue strain upon the film.

Another object of this invention is to provide in a film development spool, a one-way tension means coacting with one or both side edge portions of a photographic film which will permit motion of the film into the spool in only one direction, but which will grip and lock the film against outward motion from the spool.

Another object of this invention is to make the two end disks of a film developing spool relatively rotatable, forwards and backwards, through a small arc, whereby the film is fed step-by-step into the spool with each rotation until the entire film is wound up in the spool.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a plan view of an assembled film development spool embodying the invention.

Figure 2 is a plan view of one of the end disk members showing a spiral guide and a ball detent which permits inward movement of a film but prevents outward movement thereof.

Figure 3 is a view of a fragmentary portion of a modified end disk member and a modified detent of cam formation.

Figure 4 is a view of a fragmentary portion of a modified end disk member and showing a modified detent of leaf spring form.

Figure 5 is a cross-sectional view taken on the line 5—5 in Figure 1.

In the illustrated embodiment of the invention, the numeral 10 indicates a film development spool to which this invention is applied.

The spool 10 comprises two relatively slidable flanges or disk members 11, 11'. The inner face of the disk member 11 has a spiral groove forming a guide 12 positioned at right angles to the disk member for inserting and guiding a film 13 through a tangentially directed inlet opening 14 in the outer portion of the disk member and between the walls 15 of the spiral guide 12.

The disk member 11 has a central tubular extension or sleeve 16 having a longitudinal guide groove 17. The tubular extension 16 has a plurality of circular grooves 18 spaced apart from each other.

The disk member 11 is concentric with the tubular extension 16 and has a peripheral portion wider than defined by the walls of guide 12.

The upper disk member 11' has a groove similar to the disk member 11, forming a spiral guide 12' positioned at right angles to the disk member. The spiral guide 12' coacts with the spiral guide 12 for guiding the inserted film 13 through the inlet opening 14' in the outer portion of the disk member and between the walls of the spiral guide 12'.

It is to be noted that the spiral guides 12, 12' are similar and positioned to run in the same direction starting at the openings 14, 14' in alignment in order to allow both side edges of the film to enter the space between disk members 11, 11' simultaneously.

The disk member 11' has a central tubular extension or sleeve 20 having an inner diameter adapted to fit snugly over the tubular extension 16 of the disk member 11.

The sleeve 20 has a plurality of longitudinal through slots 21 to secure a certain degree of resiliency in the sleeve and ensure frictional engagement with the tubular extension 16.

To secure the proper alignment of the spiral guides 12, 12' of the disk members 11, 11' and permit relative rotation of these members, the inner surface of the sleeve 20 is provided with a radial projection 22 adapted to enter into engagement with the guide groove 17 of the tubular extension 16 of the disk member 11.

In order to lock the disk member 11 in the different positions corresponding to the particular widths of film to be accommodated, the inner surface of the sleeve 20 is formed with a circular projection or collar 23 adapted to snap successively into and out of the circular grooves 18 of the tubular extension 16 when the disk member 11' is moved along the tubular extension 16, as shown in Figure 1.

This invention is particularly directed to a frictional film edge engaging mechanism which will permit winding the film into the spool when the disk members 11, 11' are in properly spaced-apart relation for the particular width of the film.

For this purpose, the disk members 11, 11' are formed with wider peripheral portions 25, 25' which are also of considerably greater thickness in comparison with the thickness of the rest of the disk body on which the spiral guides 12, 12' are located. The peripheral portions 25, 25' respectively, have the inlets 14, 14' therethrough.

A channel 26 is formed in the peripheral portion 25 which is open to the interior of the spool. The lower part of the channel 26 is angularly directed to cause a ball detent 27 mounted in the channel to move toward the outer surface of the outermost wall 15 of the spiral guide 12.

As shown in Figure 2, it will be seen that a film 13 inserted into the spool 10 will pass therein between the ball detent 27 and the outer wall 15 and that the ball will exert a light pressure against the longitudinal edge of the film and force the film into frictional engagement with the outer surface of the outer wall 15 of the spiral guide 12.

Due to the angle of the cavity 26 with respect to the radius of the disk member a tapered recess is formed with the outer wall 15 of the spiral guide 12 wherein the ball 27 will be clamped with increasing force in one direction of rotary movement of the disk. The film 13 is thereby held fast against the wall 15 while the companion disk moving in the opposite direction travels freely over the film edge since the ball therein is moved toward the wider portion of the cavity 26.

The clamping action of the ball detent 27 is automatic in that the motion of the detent in any direction is self-actuated depending solely on the direction of rotation of the particular disk member of which the detent is a part. This holds true also for the modification of detent mechanisms hereinafter more fully described.

Figure 3 is a view of a fragmentary portion of a modified disk member 11a having a modified cavity 26a of substantially semi-elliptical form in the peripheral portion 25a. A cam detent 28 of substantially elliptical form is pivotally mounted at its lower end in the cavity 26a on a pin 29. This eccentric mounting of the cam detent 28 causes the cam to come into contact with the outer surface of the outermost wall 15a.

The pivoted cam detent 28 functions similarly to the ball detent 27 and causes the film 13 to be wound up within the spiral passageway between the disk members of the spool. The film 13 is held by the eccentric cam 28 against the outer wall of the guide in one direction of rotary movement of the disk. In the other direction of motion the cam 28 can pivot freely and will not clamp the film.

Figure 4 is a view of a fragmentary portion of a modified disk member 11b having a modified cavity 26b in the periphery portion 25b. A slotted pin 30 is suitably secured in the cavity 26b. A leaf spring 31 has one end secured in the pin 30 and with its free end slightly curled and in pressure contact with the outer surface of the wall 15b.

The spring 31 functions similarly to the cam 28 or to the ball detent 27 to permit the film 13 to be wound up within the spiral passageway between the disk members of the spool.

Referring to Fig. 5, it is to be noted that the groove 17 is considerably wider than the projection 22 and this permits the disk member 11' to partially rotate over the tubular extension 16 in relation to the disk member 11 through a small arc.

In operation, when an end portion of a film 13 is inserted into the spool 10 through the inlets 14, 14' the operator holds the disk 11 in one hand, and by imparting forward and rearward rotary motions to the disk 11', the film is fed into the spool, step-by-step, until the entire film is automatically wound up in the spool.

I have described and illustrated the preferred embodiments of my invention, but it will be understood that various changes and modifications can be made therein without departing from the spirit of the invention as defined by the appended claims.

I claim:

1. A spool for developing tanks accommodating a length of film comprising a pair of disk members adjustably disposed on a common axis, at selected distances from each other, at least one of said disks being rotatable relative to the other, for a predetermined angular displacement, a continuous groove forming a spiral guide having walls extending parallel said axis on the inner face of each of said disks for guiding the edges of the film inserted therein, said groove terminating near the center of each disk and starting at the outer periphery thereof, self-actuating detent means in each one of said disks for pressing the edge of the film inserted in said groove against said wall upon rotation of said disk in one direction and releasing the film upon rotation in the other direction whereby the film inserted in the grooves between said disks is forced into said spiral guide upon successive relative rotary displacement of said disks.

2. A spool in accordance with claim 1 wherein said detent means comprises a pivotally supported cam extending into said guides and engaging said walls.

3. A spool in accordance with claim 1 wherein said detent means comprises a spring member extending into said guides having one end secured to said disk and having the other film engaging end bent back and resting on said wall.

4. A spool for developing tanks accommodating a length of film comprising a pair of disk members, at least one of said disks being rotatable relative to the other, a continuous groove forming a spiral guide on the inner face of each of said disks for guiding the edges of the film inserted therein, said groove terminating near the center of each disk and starting at the outer periphery thereof, self-actuating detent means in each one of said disks for engaging the longitudinal edge of the film inserted in said groove upon rotation of said disk in one direction and releasing said engagement upon rotation in the other direction whereby the film inserted in the grooves between said disks is forced into said spiral guide upon successive relative rotary displacements of said disks.

5. A spool for developing tanks accommodating a length of film comprising a pair of disk members, at least one of said disks being rotatable relative to the other, a continuous groove forming a spiral guide on the inner face of each of said disks for guiding the edges of the film inserted therein, said groove terminating near the center of each disk and starting at the outer periphery thereof, self-actuating detent means in each one of said disks for engaging the longitudinal edge of the film inserted in said groove upon rotation of said disk in one direction and alternately releasing said engagement upon rotation in the other direction whereby the film inserted in the grooves between said disks is forced into said spiral guide upon successive relative rotary displacements of said disks.

6. A film spool for developing tanks accommodating a length of film comprising, a pair of disks members disposed on a common axis at a distance from each other determined by the width of the film to be developed, said disks being rotatable relative to each other, each of said disks having on the inner face thereof a laterally extending wall defining a continuous spiral guide groove for the longitudinal edges of the film inserted therein, said groove terminating near the center of each disk and starting at the outer periphery thereof; the peripheral portion of each of said disks having walls defining a channel in the direction inwardly terminating at the wall of said groove, said channel being narrower at the terminal end and wider near the outer periphery of said disks, a ball in each of said channels freely movable in the wider portion but retained at the terminal end, whereby said ball riding over the film inserted in said groove upon rotation of said disks in one direction is forced toward the wider portion exerting no pressure on the longitudinal edge of said film, whereas in the other direction of rotation said ball is caused to clamp said film edge against the lateral wall of said groove.

7. A film spool for developing tanks accommodating a length of film comprising, a pair of disk members disposed on a common axis at a distance from each other determined by the width of the film to be developed, said disks being rotatable relative to each other for a predetermined angular displacement, each of said disks having on the inner face thereof a laterally extending wall defining a continuous spiral guide groove for the longitudinal edges of the film inserted therein, said groove terminating near the center of each disk and starting at the outer periphery thereof, the peripheral portion of each of said disks having walls defining a channel in the direction inwardly terminating at the wall of said groove, said channel being narrower at the terminal end and wider near the outer periphery of said disks, a ball in each of said channels freely movable in the wider portion but retained at the terminal end, whereby said ball riding over the film inserted in said groove upon rotation of said disk in one direction is forced toward the wider portion exerting no pressure on the longitudinal edge of said film, whereas in the other direction of rotation said ball is caused to clamp said film edge against the lateral wall of said groove.

FREDERICK M. SIEDENBURG.

REFERENCES CITED

The following references are of record in the file of this patent:

UNITED STATES PATENTS

| Number | Name | Date |
|---|---|---|
| 2,112,606 | Pless | Mar. 29, 1938 |
| 2,484,341 | Grover, Jr. | Oct. 11, 1949 |

FOREIGN PATENTS

| Number | Country | Date |
|---|---|---|
| 657,012 | Germany | Feb. 3, 1938 |
| 680,782 | Germany | Sept. 7, 1939 |